(12) United States Patent
Park (10) Patent No.: US 9,000,718 B2
(45) Date of Patent: Apr. 7, 2015

(54) BATTERY MANAGEMENT SYSTEM INCLUDING SWITCH

(75) Inventor: Jong-Doo Park, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 662 days.

(21) Appl. No.: 13/312,811

(22) Filed: Dec. 6, 2011

(65) Prior Publication Data

US 2012/0212176 A1 Aug. 23, 2012

(30) Foreign Application Priority Data

Feb. 21, 2011 (KR) .................. 10-2011-0015031

(51) Int. Cl.
| | | |
|---|---|---|
| H01M 10/46 | (2006.01) | |
| B60L 3/00 | (2006.01) | |
| H02J 7/00 | (2006.01) | |
| B60L 3/04 | (2006.01) | |
| B60L 11/18 | (2006.01) | |

(52) U.S. Cl.
CPC ............. *B60L 3/0046* (2013.01); *H02J 7/0029* (2013.01); *H02J 7/0031* (2013.01); *H02J 7/0063* (2013.01); *B60L 3/04* (2013.01); *B60L 11/1866* (2013.01); *Y02T 10/7005* (2013.01); *H02J 2007/004* (2013.01); *H02J 2007/0067* (2013.01); *Y02T 10/7061* (2013.01)

(58) Field of Classification Search
USPC .................................. 320/107, 112, 134, 136
See application file for complete search history.

(56) References Cited

U.S. PATENT DOCUMENTS

| | | | |
|---|---|---|---|
| 4,086,525 A * | 4/1978 | Ibsen et al. ..................... 320/136 |
| 6,396,246 B2 | 5/2002 | Haraguchi et al. | |
| 2008/0116851 A1* | 5/2008 | Mori ............................. 320/134 |
| 2009/0091332 A1 | 4/2009 | Emori et al. | |
| 2009/0189572 A1* | 7/2009 | Kamatani ..................... 320/163 |
| 2010/0055543 A1 | 3/2010 | Tae et al. | |
| 2010/0253287 A1 | 10/2010 | Kim et al. | |

FOREIGN PATENT DOCUMENTS

| | | |
|---|---|---|
| JP | 2002-10509 | 1/2002 |
| JP | 2007-014148 A | 1/2007 |
| JP | 2009-89488 A | 4/2009 |
| KR | 10-2006-0037830 | 5/2006 |
| KR | 10-0878941 B1 | 1/2009 |
| KR | 10-2009-0031449 | 3/2009 |
| KR | 10-2009-0123821 | 12/2009 |
| KR | 10-2010-0024708 | 3/2010 |
| WO | WO 2008/011095 A2 | 1/2008 |

OTHER PUBLICATIONS

Korean Office action dated Feb. 24, 2012 issued to Korean priority patent application No. 10-2011-0015031, 5 pages.
Patent Abstracts of Japan and Machine English Translation of JP 2007-014148 A, 34 pages.

\* cited by examiner

*Primary Examiner* — Edward Tso
(74) *Attorney, Agent, or Firm* — Christie, Parker & Hale, LLP (57) ABSTRACT

A battery management system (BMS) in which a battery protection circuit controls a main switch using hardware without software control, thereby coping with troubles in the BMS or software errors.

10 Claims, 5 Drawing Sheets

BATTERY MANAGEMENT SYSTEM INCLUDING SWITCH

CROSS-REFERENCE TO RELATED APPLICATION

This application claims priority to and the benefit of Korean Patent Application No. 10-2011-0015031, filed on Feb. 21, 2011, in the Korean Intellectual Property Office, the disclosure of which is incorporated herein in its entirety by reference.

BACKGROUND

1. Field

Aspects of one or more embodiments of the present invention relate to battery protection circuits, and more particularly, to battery protection circuits that may be used in electric motor vehicles, methods of driving the circuits, and battery management systems including the battery protection circuits.

2. Description of the Related Art

Motor vehicles equipped with internal-combustion engines using gasoline or diesel as a main fuel can cause severe air pollution. Recently, in order to reduce air pollution, much effort has been made on developing electric or hybrid motor vehicles.

Electric motor vehicles use battery engines (e.g., electric motors) that are operated by electrical energy output from batteries. Electric motor vehicles use a battery pack, including a plurality of secondary cells that can be charged and discharged, as a main power source, and thus do not generate exhaust gas or much noise.

A hybrid motor vehicle is a cross between a motor vehicle and an electric motor vehicle, and thus uses at least two engines, for example, an internal combustion engine and a battery powered motor. Currently, different types of hybrid motor vehicles that use an internal combustion engine and a fuel cell that provides electrical energy directly obtained from a chemical reaction generated using a continuous supply of hydrogen and oxygen, or a battery and a fuel cell, have been developed.

In an electric motor vehicle using a battery, the performance of the battery directly affects the performance of the motor vehicle.

SUMMARY

Aspects of embodiments according to the present invention are directed toward maintaining cells of a battery in a high performance state and a battery management system that can effectively control charging and discharging of each of the cells by measuring voltages of the cells and both a voltage and a current of the battery.

One or more embodiments of the present invention include a battery management system (BMS) in which a main switch is controlled using hardware to cope with troubles of the BMS or software errors.

Additional aspects will be set forth in part in the description which follows and, in part, will be apparent from the description, or may be learned by practice of the presented embodiments.

According to one or more embodiments of the present invention, a battery management system (BMS) for managing a power supply from a battery to an inverter, includes: a reference voltage generator connected in parallel to the battery and configured to generate a reference voltage; a comparator for comparing a battery voltage from a terminal of the battery with a reference voltage output by the reference voltage generator; and a switch for blocking a current flow of the battery according to an output signal generated by the comparator.

The reference voltage may include a first reference voltage for determining an overcharge of the battery or a second reference voltage for determining an overdischarge of the battery, and the comparator is configured to determine whether or not the battery voltage is greater than the first reference voltage, or whether or not the battery voltage is less than the second reference voltage.

The BMS may further include a transistor that is configured to turn on in response to the output signal generated by the comparator in order to open the switch.

The comparator may be configured to generate a signal that turns on the transistor when the battery voltage is greater than the first reference voltage or the battery voltage is less than the second reference voltage.

The comparator may be configured to output a reset signal that resets an operation of controlling the switch when the battery voltage is greater than the first reference voltage or the battery voltage is less than the second reference voltage.

The battery may include at least two batteries, and the comparator may include at least two comparators for respectively comparing battery voltages at terminals of the at least two batteries with at least two reference voltages output by the reference voltage generator.

The BMS may further include a charge pump connected between the reference voltage generator and at least one of the at least two comparators.

The BMS may further include an OR gate circuit between both the at least two comparators and the transistor, wherein the transistor is configured to turn on in response to a signal output by the OR gate circuit.

The BMS may further include a transistor that is configured to turn on in response to the output signal generated by the comparator in order to open the main switch.

The inverter may be configured to supply power to a motor for driving a vehicle.

According to another embodiment of the present invention, a device is provided for managing a battery. The device includes a reference voltage generator powered by the battery and configured to generate a reference voltage, a comparator for generating a control signal based on a comparison of a voltage of the battery and the reference voltage, and a switch for interrupting charging or discharging of the battery in accordance with the control signal. The reference voltage generator, the comparator, and the switch are operated to manage the battery without software control.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present invention.

The present invention will now be described more fully with reference to the accompanying drawings in which exemplary embodiments of the invention are shown. In the following descriptions, only elements or units that are needed to understand the operation according to the present invention are described, and description of elements or units that can make the present invention unclear is omitted.

Also, it will be understood that terms and words used in the context and claims should not be interpreted as limited to those defined in commonly used dictionaries, and should be interpreted as having a meaning that is consistent with the meaning and concept of the technical spirit of the present invention.

Figure 1:
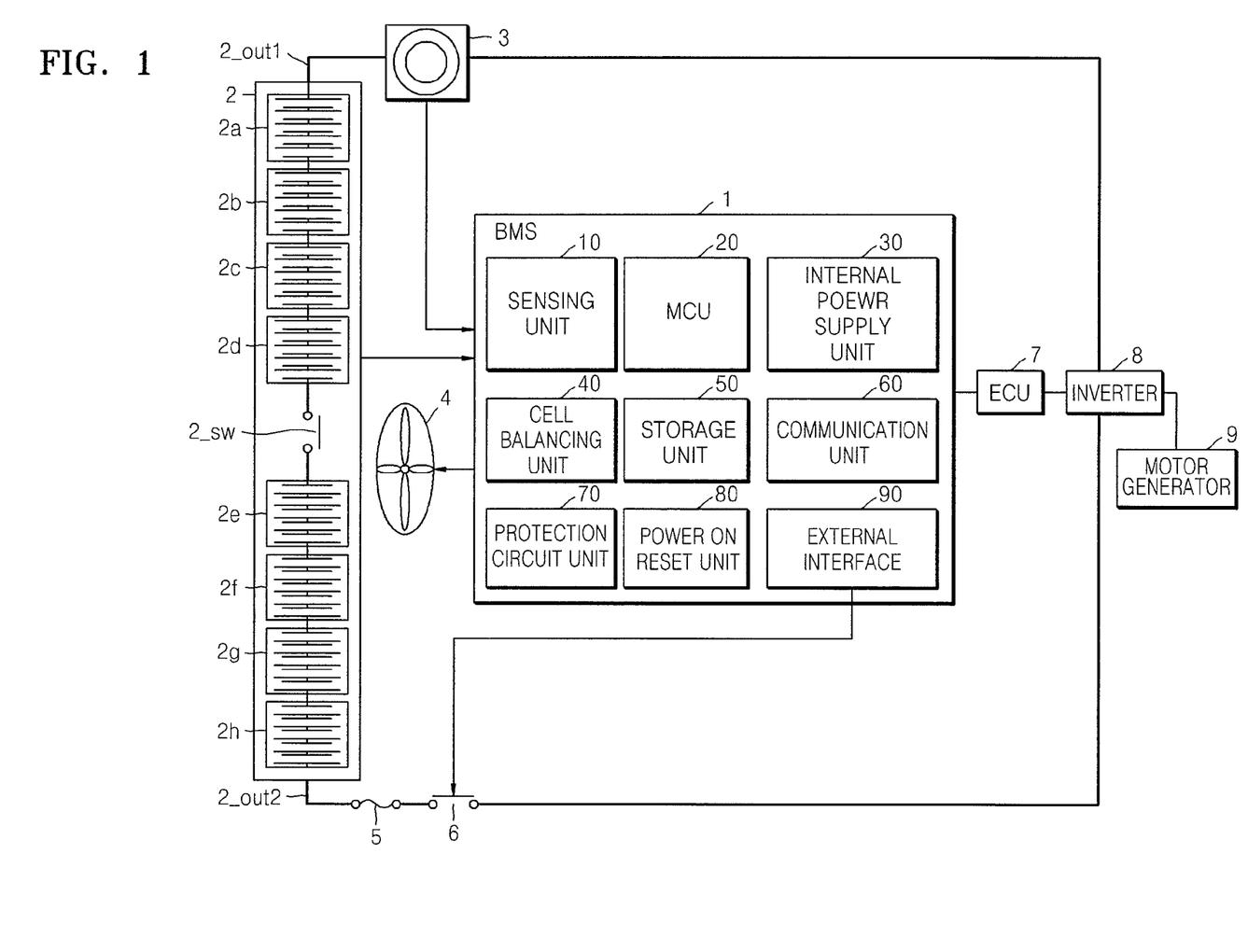
FIG. 1 is a schematic drawing showing a battery, a battery management system (BMS), and peripheral elements of the BMS.

FIG. 1 is a schematic drawing showing a battery, a battery management system (BMS), and peripheral elements of the BMS.

Referring to FIG. 1, a BMS 1, a battery 2, a current sensor 3, a cooling fan 4, a fuse 5, a main switch 6, an engine control unit (ECU) 7, an inverter 8, and a motor generator 9 are included in an electric motor vehicle.

The battery 2 includes a plurality of subpacks 2a through 2h, each including a plurality of cells connected in series to each other. The battery 2 further includes an output terminal 2_OUT1, an output terminal 2_OUT2, and a safety switch 2_SW provided between the subpack 2d and the subpack 2e. In the example shown in FIG. 1, eight subpacks 2a through 2h are depicted, and each of the subpacks 2a through 2h represents a group of a plurality of cells. However, the subpacks 2a through 2h according to the current embodiment are not limited thereto. The safety switch 2_SW is provided between the subpacks 2d and 2e to be manually turned on or off for the safety of operators when the battery 2 is being replaced or when work is being done on the battery 2. While the safety switch 2_SW is provided between the subpacks 2d and 2e in the current embodiment, the present invention is not limited thereto. The output terminal 2_OUT1 and the output terminal 2_OUT2 are connected to the inverter 8.

The current sensor 3 measures an amount of current output by the battery 2 and transmits the measurement to a sensing unit 10 of the BMS 1. In one embodiment, the current sensor 3 may be a Hall current transformer (Hall CT) that measures an output current using a Hall device and outputs an analogue signal corresponding to the measured current.

The cooling fan 4 transfers heat generated by charging/discharging the battery 2 away from the battery 2 in response to a control signal of the BMS 1, thereby preventing the battery 2 from being degraded due to high temperature and a reduction of charge/discharge efficiency.

The fuse 5 prevents an overcurrent that is caused by a disconnected wire or a short circuit in the battery 2 from being transmitted to the battery 2. That is, when an overcurrent is generated, the fuse 5 is blown, and thus the overcurrent can no longer be transmitted to the battery 2.

The main switch 6 controls a supply of a current to or from the battery 2 in response to a control signal of the BMS 1 or the ECU 7 of the electric motor vehicle when an abnormality such as an overvoltage, an overcurrent, or a relatively high temperature occurs. Here, the main switch 6 is described as being disposed in a negative path. However, the location of the main switch 6 according to the current embodiment is not limited thereto. The main switch 6 is generally controlled using software running in the BMS 1. However, if there is a problem with the BMS 1, for example, a problem with a main control unit (MCU) 20 or a power supply failure, the BMS 1 may not be able to control the main switch 6. In the current embodiment, the main switch 6 is controlled through a battery protection circuit, that is, hardware, and not through a battery protecting operation provided by software of the BMS 1. Battery protection circuits according to embodiments of the present invention will be described later with reference to FIGS. 2 and 3.

The BMS 1 includes the sensing unit 10, the MCU 20, an internal power supply unit 30, a cell balancing unit 40, a storage unit 50, a communication unit 60, a protection circuit unit 70, a power-on reset unit 80, and an external interface unit 90.

The sensing unit 10 measures a current of the battery 2 (hereinafter, a battery current), a voltage of the battery 2 (hereinafter, a battery voltage), temperatures of the cells, and ambient temperatures of the subpacks 2a through 2h, and transmits the measurements to the MCU 20. Also, the sensing unit 10 measures a voltage of the inverter 8, and transmits the measurement to the MCU 20.

The MCU 20 calculates a state of aging and a state of health (SOH) of the battery 2 by calculating a state of charging (SOC) and a variation of internal resistance of the battery 2 based on the measurements of the battery current, the battery voltage, the voltages of the cells, the temperatures of the cells, and the ambient temperatures of the subpacks 2a through 2h, which are transmitted from the sensing unit 10. That is, the MCU 20 generates information indicating a state of the battery 2.

The internal power supply unit 30 is an apparatus for supplying power to the BMS 1 by using, for example, an auxiliary battery. The cell balancing unit 40 balances a charge state of each of the cells. That is, cells that are relatively overcharged are discharged, and cells that are relatively undercharged are charged. The storage unit 50 stores current data pertaining to the SOC and the SOH when the BMS 1 is turned off. Here, the storage unit 50 may be a nonvolatile storage device that can electrically write and erase data, and for example, may be an electrically erasable programmable read-only memory (EEPROM). The communication unit 60 communicates with the ECU 7 of the electrical motor vehicle. The communication unit 60 transmits information pertaining to the SOC and the SOH from the BMS 1 to the ECU 7, or transmits information about a state of the electrical motor vehicle from the ECU 7 to the MCU 20. The protection circuit unit 70 is a circuit for protecting the battery 2 using firmware. The power-on reset unit 80 resets the BMS 1 when the BMS 1 is turned on. The external interface unit 90 is a device for connecting auxiliary apparatuses of the BMS 1, such as the cooling fan 4 and the main switch 6, to the MCU 20. In FIG. 1, only the cooling fan 4 and the main switch 6 are depicted. However, the current embodiment is not limited thereto.

The ECU 7 checks a current driving state of the electrical motor vehicle based on information pertaining to, e.g., an accelerator, a brake, and a speed, and determines information such as torque information. In more detail, the current driving state of the electrical motor vehicle denotes information pertaining to, e.g., a key-on operation, a key-off operation, a steady driving state, and an accelerating state. The ECU 7 transmits information pertaining to the driving state of the electrical motor vehicle to the communication unit 60 of the BMS 1. The ECU 7 controls an output of the motor generator 9 according to the torque information. That is, the ECU 7 controls an output of the motor generator 9 according to the torque information by controlling switching of the inverter 8. Also, the ECU 7 controls the SOC to be a target value (for example, 55%) by receiving the SOC of the battery 2 transmitted from the MCU 20 through the communication unit 60 of the BMS 1. For example, when the SOC transmitted from the MCU 20 is 55% or less, the ECU 7 controls the switching of the inverter 8 to output electric power to the battery 2 to charge the battery 2, and in this case, a battery current is negative (−). However, when the SOC is 55% or greater, the ECU 7 controls the switching of the inverter 8 to output electric power to the motor generator 9 to discharge the battery 2, and in this case, the battery current is positive (+).

The inverter 8 controls charging or discharging of the battery 2 in response to a control signal of the ECU 7. Also, the inverter 8 transforms power of the battery 2 and transmits the transformed power to the motor generator 9.

The motor generator 9 drives the electrical motor vehicle in response to the torque information transmitted from the ECU 7 using electrical energy of the battery 2.

The ECU 7 prevents the battery 2 from being overcharged or overdischarged by appropriately charging and discharging the battery 2 in response to the SOC, and thus enables the battery 2 to be efficiently operated for a period of time. However, although it is difficult to measure the SOC after the battery 2 is mounted on the electrical motor vehicle, the BMS 1 is able to transmit the SOC after correctly estimating the SOC using the battery voltage, the battery current, and the cell temperatures sensed by using the sensing unit 10.

Figure 2:
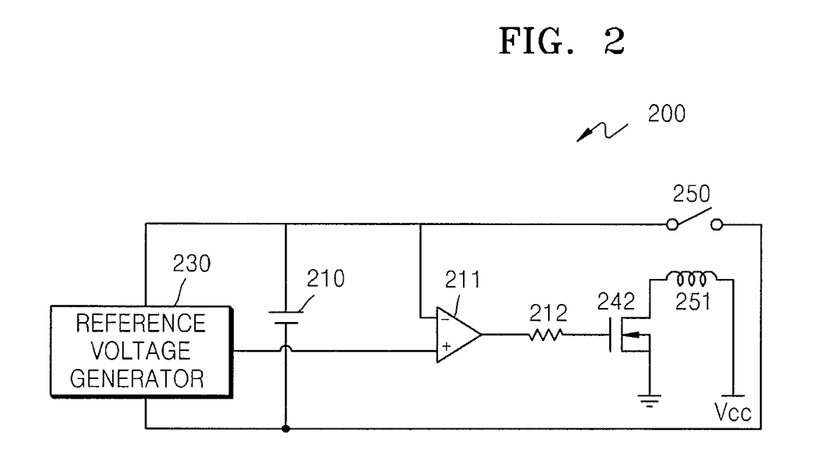
FIG. 2 is a circuit diagram of a battery protection circuit according to an embodiment of the present invention.

FIG. 2 is a circuit diagram of a battery protection circuit 200 according to an embodiment of the present invention. The battery protection circuit 200 may be a part of the BMS 1 or a circuit separate from the BMS 1.

Referring to FIG. 2, the battery protection circuit 200 includes a battery 210; a reference voltage generator 230; a comparator 211 connected to a first terminal of the battery 210, that is, a positive terminal of the battery, and an output terminal of the reference voltage generator 230; a resistor 212; a transistor 242; a coil 251; and a main switch 250. In FIG. 2, the battery 210 is depicted as a single battery, but it is not limited thereto.

The reference voltage generator 230 is connected in parallel to the battery 210 and generates a reference voltage using a voltage of the battery 210. Here, the reference voltage is a voltage used to determine whether the battery 210 is overdischarged or overcharged. For example, the reference voltage may be 4.2 V for determining an overcharge. In addition, the reference voltage may be 2.8 V for determining an overdischarge. The reference voltage generator 230 may be a regulator, for example, a low dropout (LDO) regulator, but is not limited thereto. The LDO regulator has an advantage in that it can generate a predetermined voltage using a low input-voltage.

The comparator 211 compares the voltage of the battery 210 to the reference voltage output from the reference voltage generator 230. For example, when the voltage of the battery 210 is greater than the reference voltage, which may be 4.2 V, or less than the reference voltage, which may be 2.8 V, the comparator 211 generates a signal for turning on the transistor 242, for example, a voltage signal having a predetermined voltage; However, when the voltage of the battery 210 is lower than 4.2V and higher than 2.8 V, the comparator 211 outputs no signal (i.e., a signal that does not turn on the transistor 242), and thus the transistor 242 is maintained in an off state. That is, the comparator 211 determines whether the battery 210 is overcharged or overdischarged.

The resistor 212 functions as a buffer that controls the voltage signal output from the comparator 211.

The transistor 242 is turned on in response to the predetermined voltage signal output by the comparator 211, and thus a power source Vcc supplies a current to the coil 251 to open or close the main switch 250. Here, the transistor 242 may be an N-channel metal oxide semiconductor (NMOS) transistor or a P-channel metal oxide semiconductor (PMOS) transistor, but is not limited thereto.

Accordingly, the battery 210 may be prevented from exploding and thus an inverter or a motor connected to the battery 210 may be protected, not by controlling the BMS 1 using software, but by sensing an overdischarge or an overcharge of the battery 210 using hardware, in order to block a current flow.

Figure 3:
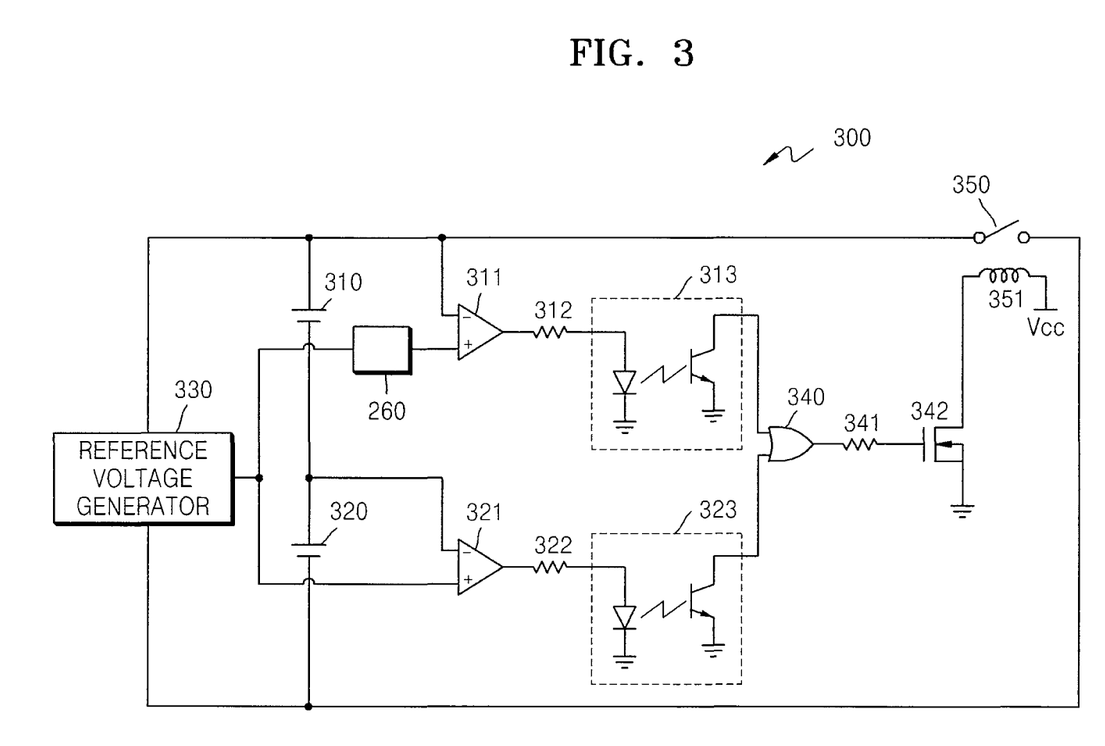
FIG. 3 is a circuit diagram of a battery protection circuit according to another embodiment of the present invention.

FIG. 3 is a circuit diagram of a battery protection circuit 300 according to another embodiment of the present invention. The battery protection circuit 300 may be a part of the BMS 1 or a circuit separate from the BMS 1.

Referring to FIG. 3, the battery protection circuit 300 includes a reference voltage generator 330 connected to two batteries 310 and 320 in parallel, a comparator 311 that receives a voltage of a terminal of the battery 310 and a reference voltage output from the reference voltage generator 330, and a comparator 321 that receives a voltage of a terminal of the battery 320 and the reference voltage output from the reference voltage generator 330. The comparators 311 and 321 respectively determine whether the batteries 310 and 320 are to be cell-balanced. A charge pump 260 is connected between the reference voltage generator 330 and the comparator 311. The charge pump 260 stores charges to generate a required output voltage by summing an input voltage and a voltage charged in a condenser. When the reference voltage generated by the reference voltage generator 330 is applied to both the comparators 311 and 321, the reference voltage is reduced since the reference voltage is divided into two portions. In order to compensate for the reduction of the reference voltage, the charge pump 260 increases a voltage being applied to the comparator 311 to the reference voltage. In the current embodiment, two comparators 311 and 321 are depicted in FIG. 3, but the present invention is not limited thereto.

The comparators 311 and 321 respectively compare the voltages of the batteries 310 and 320 to the reference voltage. Signals output from the comparators 311 and 321 are respectively transmitted to optical couplers 313 and 323 through resistors 312 and 322. The optical couplers 313 and 323 optically insulate comparator terminals and switching terminals. In general, an optical coupler is molded using a white or black color plastic and has a structure in which a high output infrared light-emitting diode (LED) formed of an arsenic gallium and a high sensitivity silicon photo transistor are disposed to face each other, and a transparent material such as transparent silicon or optical fibers are filled in a space therebetween to allow light emitted from the LED to be transmitted to the photo transistor. If a voltage is applied to the LED in this manner, light is easily transmitted, but the voltage cannot be easily transmitted through the transparent material, and thus the LED is optically insulated from the photo transistor. While the LED and the photo transistor are not electrically connected at all, if a current is applied to the LED, light is emitted from the LED to the photo transistor opposite to the LED, without leaking to any other place, and thus the LED and the photo transistor communicate via the light, and the photo transistor operates according to a signal of the LED. In the same manner, signals output from each of the comparators 311 and 321 are input to an OR gate 340. The output signals indicate whether the batteries 310 and 320 are in an overcharged state or an overdischarged state. The OR gate 340 outputs a signal that turns on the transistor 342 via a resistor 341 when an output signal is input from one of the comparators 311 and 321. When the transistor 342 is turned on, a power source Vcc supplies a current to a coil 351, thereby turning off a main switch 350.

Figure 4:
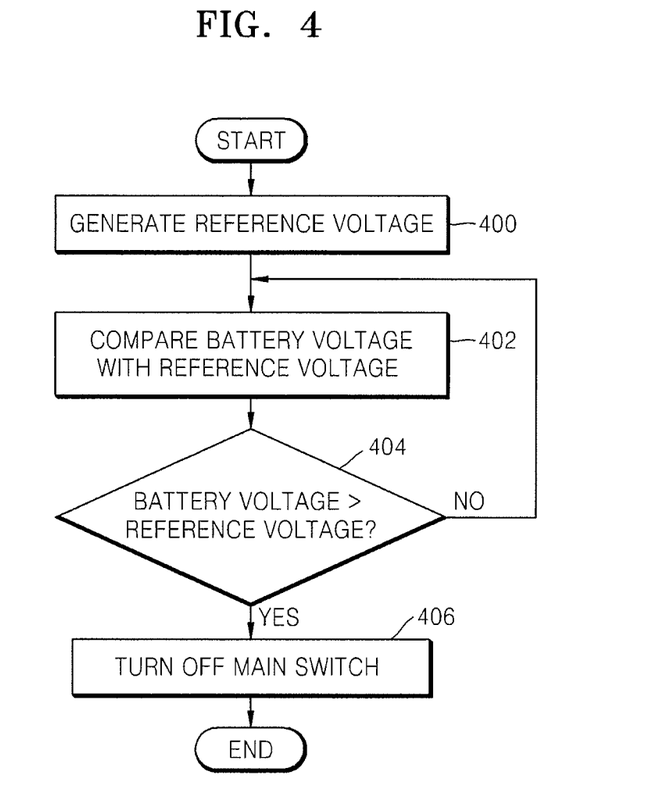
FIG. 4 is a flowchart illustrating a method of driving a battery protection circuit according to an embodiment of the present invention.

FIG. 4 is a flow chart illustrating a method of driving a battery protection circuit according to an embodiment of the present invention.

Referring to FIG. 4, a reference voltage is generated in operation 400. Here, the reference voltage refers to a voltage with which an overdischarge or overcharge of a battery can be determined. A voltage of the battery is compared with the reference voltage in operation 402.

If the voltage of the battery is greater than the reference voltage in operation 404, a main switch is turned off to block a current from flowing from the battery to an inverter in operation 406. If the voltage of the battery is smaller than the reference voltage in operation 404, the method returns to operation 402. Here, the battery voltage is compared with the reference voltage, which may be 4.2 V to determine an overcharge; however, the reference voltage may be 2.8 V to determine an overdischarge.

In the current embodiment, the generating of a reference voltage, the comparing of a voltage of a battery with the reference voltage, and the controlling of a main switch are performed using hardware without software control. Therefore, weak points of controlling the main switch performed using software in a conventional BMS can be avoided or compensated for. Also, problems with a battery management system or software errors can be appropriately handled.

Figure 5:
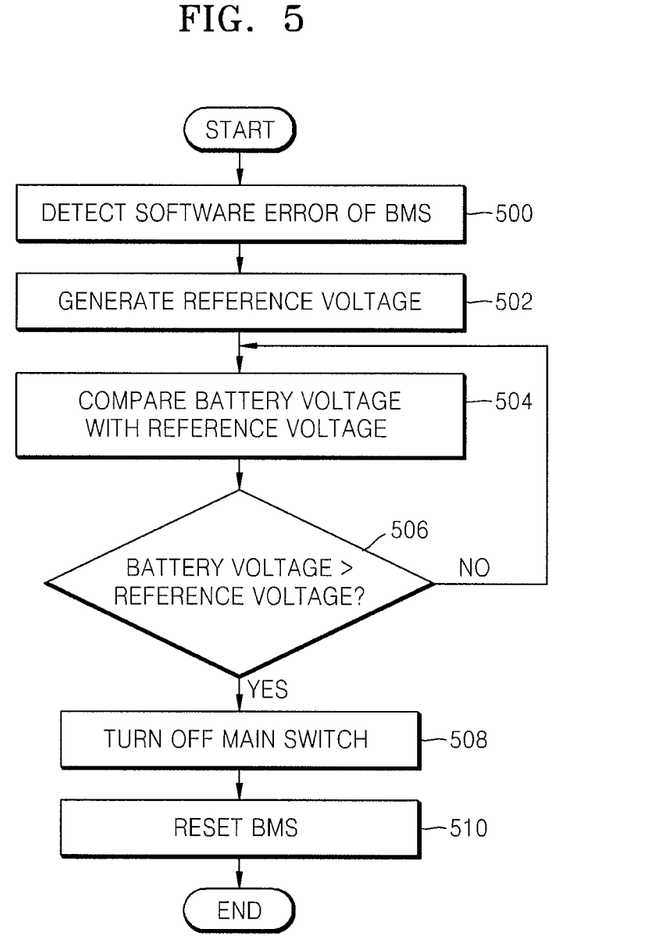
FIG. 5 is a flowchart illustrating a method of driving a battery protection circuit according to another embodiment of the present invention.

FIG. 5 is a flowchart illustrating a method of driving a battery protection circuit according to another embodiment of the present invention.

Referring to FIG. 5, in operation 500, a software error of a BMS is detected. Here, a software error refers to an instance where a main switch cannot be controlled by the BMS to prevent an overcharge or overdischarge of a battery.

In operation 502, a reference voltage is generated. In operation 504, a battery voltage and the reference voltage are compared. In operation 506, if the battery voltage is greater than the reference voltage, the main switch is turned off in operation 508. As described with reference to FIG. 4, here, an instance where the battery voltage is greater than the reference voltage (overcharge) is described, but the method may also be applied to cases where the battery voltage is less than a reference voltage for determining an overdischarge (overdischarge) condition. In operation 510, the BMS is reset. The BMS may be reset by using the output signal of the comparators illustrated in FIG. 2 or FIG. 3 as a reset signal of the BMS.

In the battery protection circuits according to the embodiments of the present invention, a main switch is controlled using hardware to cope with troubles in the BMSs or software errors.

The particular implementations shown and described herein are illustrative examples of the invention and are not intended to otherwise limit the scope of the invention in any way. For the sake of brevity, conventional electronics, control systems, software development and other functional aspects of the systems are not described in detail. Furthermore, the connecting lines, or connectors shown in the various figures presented are intended to represent exemplary functional relationships and/or physical or logical couplings between the various elements. It should be noted that many alternative or additional functional relationships, physical connections, or logical connections may be present in a practical device. Moreover, no item or component is essential to the practice of the invention unless the element is specifically described as "essential" or "critical."

The use of the terms "a," "an," and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the operations of all methods described herein can be performed in any suitable order unless otherwise indicated herein or otherwise clearly contradicted by context. The present invention is not limited to the described order of the operations. The use of any and all examples, or exemplary language (e.g., "such as") provided herein, is intended merely to better illuminate the invention and does not pose as a limitation on the scope of the invention unless otherwise claimed. Numerous modifications and adaptations will be readily apparent to those skilled in this art without departing from the spirit and scope of the present invention as defined by the following claims, and equivalents thereof.

What is claimed is:

1. A battery management system (BMS) for managing a power supply from a battery to an inverter, comprising:
   a reference voltage generator connected in parallel to the battery and configured to generate a reference voltage;
   a comparator for comparing a battery voltage from a terminal of the battery with the reference voltage output by the reference voltage generator;
   a charge pump connected between the reference voltage generator and the comparator; and
   a switch for blocking a current flow of the battery according to an output signal generated by the comparator.

2. The BMS of claim 1, wherein the reference voltage comprises a first reference voltage for determining an overcharge of the battery or a second reference voltage for determining an overdischarge of the battery, and
   the comparator is configured to determine whether or not the battery voltage is greater than the first reference voltage, or whether or not the battery voltage is less than the second reference voltage.

3. The BMS of claim 2, further comprising a transistor that is configured to turn on in response to the output signal generated by the comparator in order to open the switch.

4. The BMS of claim 3, wherein the comparator is configured to generate a signal that turns on the transistor when the battery voltage is greater than the first reference voltage or the battery voltage is less than the second reference voltage.

5. The BMS of claim 3, wherein the battery comprises at least two batteries, and the comparator comprises at least two comparators for respectively comparing battery voltages at terminals of the at least two batteries with at least two reference voltages output by the reference voltage generator.

6. The BMS of claim 5, wherein the charge pump is connected between the reference voltage generator and at least one of the at least two comparators.

7. The BMS of claim 5, further comprising an OR gate circuit between both the at least two comparators and the transistor, wherein the transistor is configured to turn on in response to a signal output by the OR gate circuit.

8. The BMS of claim 2, wherein the comparator is configured to output a reset signal that resets an operation of controlling the switch when the battery voltage is greater than the first reference voltage or the battery voltage is less than the second reference voltage.

9. The BMS of claim 1, wherein the inverter is configured to supply power to a motor for driving a vehicle.

10. A device for managing a battery comprising:
- a reference voltage generator powered by the battery and configured to generate a reference voltage;
- a comparator for generating a control signal based on a comparison of a voltage of the battery and the reference voltage;
- a charge pump connected between the reference voltage generator and the comparator; and
- a switch for interrupting charging or discharging of the battery in accordance with the control signal wherein the reference voltage generator, the comparator, and the switch are operated to manage the battery without software control.

\* \* \* \* \*